United States Patent
Vagell

(10) Patent No.: US 8,898,557 B1
(45) Date of Patent: Nov. 25, 2014

(54) TECHNIQUES FOR SYNCHRONIZATION OF A PRINT MENU AND DOCUMENT ANNOTATION RENDERINGS BETWEEN A COMPUTING DEVICE AND A MOBILE DEVICE LOGGED IN TO THE SAME ACCOUNT

(75) Inventor: Vance Julius Vagell, Kew Gardens, NY (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 13/426,038

(22) Filed: Mar. 21, 2012

(51) Int. Cl.
*G06F 3/01* (2006.01)
*G06F 17/00* (2006.01)
*G06F 17/22* (2006.01)
*G06F 3/0482* (2013.01)
*G06F 17/24* (2006.01)

(52) U.S. Cl.
CPC .......... *G06F 17/2247* (2013.01); *G06F 3/0482* (2013.01); *G06F 17/241* (2013.01)
USPC .......................................... 715/230; 715/741

(58) Field of Classification Search
USPC ......................................................... 715/230
See application file for complete search history.

(56) References Cited

U.S. PATENT DOCUMENTS

| | | | |
|---|---|---|---|
| 2004/0172533 A1* | 9/2004 | DeMello et al. | 713/164 |
| 2006/0029296 A1* | 2/2006 | King et al. | 382/313 |
| 2007/0115290 A1* | 5/2007 | Polzin et al. | 345/501 |
| 2009/0265607 A1* | 10/2009 | Raz et al. | 715/233 |
| 2010/0095332 A1* | 4/2010 | Gran et al. | 725/93 |
| 2011/0045816 A1* | 2/2011 | Wang et al. | 455/420 |
| 2011/0316868 A1* | 12/2011 | Katou | 345/582 |
| 2012/0079126 A1* | 3/2012 | Evans et al. | 709/230 |
| 2013/0031487 A1* | 1/2013 | Olsen et al. | 715/751 |

OTHER PUBLICATIONS

Masoodian et al. "Recoled:A Group-Aware Collaboration Text Editor for Capturing Document History", 2005, 1-8.*
Readdle Inc, PDF Expert for iPad, Aug. 18, 2011, 1-25.*

* cited by examiner

*Primary Examiner* — Cesar Paula
*Assistant Examiner* — Hassan Mrabi
(74) *Attorney, Agent, or Firm* — Remarck Law Group PLC

(57) ABSTRACT

A computer-implemented method includes providing, from a server including one or more processors, a user interface element to a first computing device, wherein the first computing device is associated with a user, and the server determines that the user is associated with a second computing device that is a mobile computing device having a digital display and is logged into an account at both the first and second computing devices. The method further includes receiving a user request for a rendering of a document issued by the first computing device upon selection of the user interface element by a user, and transmitting a command to the second computing device that causes the second computing device to automatically display the rendering of the document. The method further includes receiving and storing annotation information corresponding to one or more annotations to the rendering made at the second computing device.

38 Claims, 6 Drawing Sheets

TECHNIQUES FOR SYNCHRONIZATION OF A PRINT MENU AND DOCUMENT ANNOTATION RENDERINGS BETWEEN A COMPUTING DEVICE AND A MOBILE DEVICE LOGGED IN TO THE SAME ACCOUNT

BACKGROUND

Mobile computing devices, such as mobile phones, tablet computers and the like, are typically portable and convenient to carry. Mobile computing devices typically connect wirelessly to one or more networks such as a mobile telephone network and/or the Internet. Mobile computing devices are being utilized by users to perform every day for tasks such as accessing websites, watching movies, viewing pictures and reading books and e-mail.

SUMMARY

In one aspect, this disclosure features a computer-implemented method that can include providing, from a server including one or more processors, a user interface element to a first computing device, wherein the first computing device is associated with a user, and the server determines that the user is associated with a second computing device that is a mobile computing device having a digital display and is logged into an account at both the first and second computing devices. The method can further include receiving, at the server, a user request for a rendering of a document, the user request being issued by the first computing device upon selection of the user interface element by a user. The method can also include transmitting, from the server, a command to the second computing device that causes the second computing device to automatically display the rendering of the document. Additionally, the method can include receiving, at the server, annotation information from the second computing device, the annotation information corresponding to one or more annotations to the rendering made at the second computing device. The method can further include storing the annotation information at a memory of the server.

The annotation information can include one or more layers including the one or more annotations, the one or more layers overlaying the rendering of the document. In one aspect, determining that the user is associated with both the first and second computing devices is based on registry information stored at the server. In further aspects, the rendering can comprise an image of the document.

In one aspect, this disclosure features a computer-implemented method that can include receiving, at a mobile computing device including one or more processors, a command from a server, the command being associated with a user request for a rendering of a document. The method can also include obtaining, at the mobile computing device, the rendering of the document. Further, the method can include automatically displaying, at a display of the mobile computing device, the rendering of the document in response to the command. The method can additionally include receiving, at the mobile computing device, annotations to the rendering of the document from a user and generating, at the mobile computing device, an annotated version of the rendering by overlaying the annotations over the rendering of the document.

The annotated version of the rendering can include a plurality of layers, the plurality of layers including the rendering of the document and one or more layers of the annotations made by the user via the mobile computing device. The one or more layers of annotations can be separated based on at least one of an annotation mode used by the user to make the annotations and a time at which the user made the annotations. The method can further include transmitting, from the mobile computing device, the one or more layers of the annotations but not the rendering to the server for storage. Further, the document may have been created or edited by the user at a computing device associated with the user prior to the receiving of the command at the mobile computing device.

The method may further include receiving an input from the user at the mobile computing device after generation of the annotated version of the rendering, the input indicating one or more devices to receive the annotated version of the rendering. Additionally, the method can include transmitting, from the mobile computing device, the annotated version of the rendering to a paper printer in response to the input. The method can also include transmitting, from the mobile computing device, the annotated version of the rendering to the server for storage. Obtaining the rendering of the document can include receiving, at the mobile computing device, document information associated with the document, and generating, at the mobile computing device, the rendering of the document based on the document information received.

In one aspect, obtaining the rendering of the document can include receiving, at the mobile computing device, the rendering of the document from at least one of the server and a second computing device. The method can further include preventing, at the mobile computing device, modification of the rendering.

In other aspects, the method can further include determining, at the mobile computing device, that the display of the mobile computing device is in an inactive state, wherein automatically displaying the rendering includes activating the display. Automatically displaying the rendering can include filling a usable area of the display, and/or delaying displaying of the rendering until the mobile computing device is at a particular location or until a particular time. The method can further include authenticating, at the mobile computing device, the user such that the user is associated with the mobile computing device.

In another aspect, this disclosure features a server that can include a memory and an authentication determination module. The authentication determination module can be configured to determine that a user is associated with both a first computing device and a second computing device and is logged in to an account at both the first and second computing devices. The second computing device can be a mobile computing device having a digital display. The server can further include a rendering control module configured to provide a user interface element to the first computing device, receive a user request for a rendering of a document from the first computing device and transmit a command to the second computing device, the command causing the second computing device to automatically display the rendering of the document. The server can also include an annotation control module configured to receive annotation information from the second computing device. The annotation information can correspond to one or more annotations to the rendering made at the second computing device. Additionally, the server can include a memory control module configured to store the annotation information at the memory of the server.

The annotation information can include one or more layers including the one or more annotations, the one or more layers overlaying the rendering of the document. The authentication determination module can be further configured to determine that the user is associated with both the first and second computing devices based on registry information stored at the server. The rendering can comprise an image of the document.

In one aspect, this disclosure features a mobile computing device comprising one or more processors. The mobile computing device can include a user interface module configured to receive, from a server, a command associated with a user request for a rendering of a document and obtain the rendering of the document. The mobile computing device can further include a touch display configured to automatically display the rendering of the document in response to the command and receive annotations to the rendering of the document from a user. The mobile computing device can further include a rendering annotating module configured to generate an annotated version of the rendering by overlaying the annotations over the rendering of the document. The annotated version of the rendering can include a plurality of layers, which include the rendering of the document and one or more layers of the annotations made by the user via the mobile computing device. The one or more layers of annotations can be separated based on at least one of an annotation mode used by the user to make the annotations and a time at which the user made the annotations. Further, the rendering annotating module can be further configured to transmit the one or more layers of the annotations but not the rendering to the server for storage. The document can also be created or edited by the user at a computing device associated with the user prior to the receiving of the command at the mobile computing device.

In one aspect, the user interface module can be further configured to receive an input from the user after generation of the annotated version of the rendering, the input indicating one or more devices to receive the annotated version of the rendering. The rendering annotating module can be further configured to transmit the annotated version of the rendering to a paper printer in response to the input, and/or to transmit the annotated version of the rendering to the server for storage in response to the input. The user interface module can obtain the rendering of the document by receiving document information associated with the document, and generating the rendering of the document based on the document information received. The user interface module can obtain the rendering of the document by receiving the rendering of the document from at least one of the server and a second computing device. The rendering annotating module can be further configured to prevent modification of the rendering. Additionally, the user interface module can be further configured to determine that the touch display is in an inactive state and activate the touch display upon automatically displaying the rendering.

In another aspect, automatically displaying the rendering can include filling a usable area of the display, and/or delaying displaying of the rendering until the mobile computing device is at a particular location or until a particular time. The user interface module can be further configured to authenticate the user such that the user is associated with the mobile computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
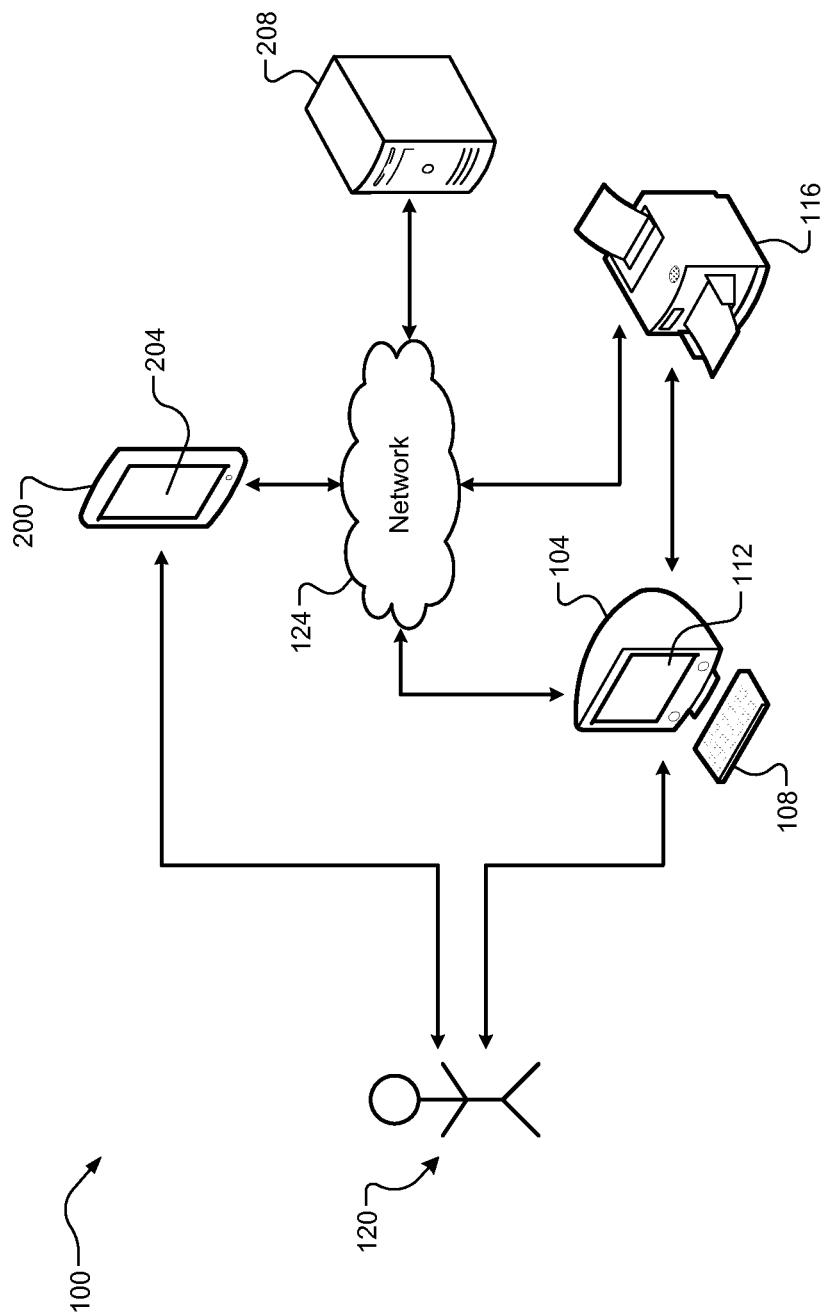
FIG. 1 is a schematic illustration of interaction between a user, a computing device, a mobile computing device, a server, and a paper printer according to some implementations of the present disclosure.

Referring now to FIG. 1, an example of a system 100 for displaying and coordinated annotating of documents according to some implementations of the present disclosure is illustrated. The system 100 includes a computing device 104, e.g., a desktop computer, having a user interface 108 and a display 112, in addition to other suitable components such as a processor, memory, and the like (not shown). The system 100 may also optionally include a paper printer 116 connected either directly to the computing device 104 or connected to the computing device via a network 124. The network 124 can include a local area network (LAN), a wide area network (WAN), e.g., the Internet, or a combination thereof. The system 100 further includes a mobile computing device 200 such as a mobile phone, a tablet computer, a laptop computer, a portable screen, or the like. The mobile computing device 200 may be associated with the user 120 either persistently (e.g., by being owned and/or registered to the user 120) or temporarily (e.g., by being in close proximity to the user 120 and/or the computing device 104). For example, the mobile computing device 200 may be both operated by and transported by the user 120, e.g., in a hand, a pocket, or a bag.

In some embodiments, the user 120 may create and/or edit a document via the computing device 104. For example, the user 120 may create and/or edit the document via word processing software at the computing device 104. Alternatively, the user 120 may create and/or edit a document stored on a server 208 through interaction with the computing device 104 in communication with the server 208, e.g., through the network 124. The user 120 may also print a document to paper using the paper printer 116 connected to the computing device 104. For example, the user 120 may select a command at the computing device 104 and the computing device 104 may transmit the data to the paper printer 116, which may then print the document onto paper.

Techniques for displaying and coordinating annotation of a document by a user between a computing device and a mobile computing device are presented. The techniques generally provide for easier and/or more efficient annotating of documents by the user, which may decrease costs accrued due to paper usage. For example, the techniques can provide for easier maintenance of multiple versions of a document (compared to stacks of paper) and selection of a particular version of a document at the mobile computing device. In some embodiments, the techniques can include providing a user interface element to a user 120 at a first computing device (e.g., the desktop computer 104) that, when selected by the user 120, issues or causes to be issued a command that causes a second computing device (e.g., mobile computing device 200) to display a rendering of the document, as is further described below.

The techniques include providing, via a display of the computing device, a user interface element (e.g., a selectable command) to the user 120 that indicates a request to transmit a rendering of a document to the mobile computing device 200. The rendering of the document may be any suitable type of data file. The rendering of the document may be used to preserve the integrity of the original document, while still allowing annotations by the user. In other words, the rendering of the document may be annotated by the user, but the original document, e.g., a word processing file, may be unaltered. The rendering of the document can be performed such that there is no text reflow in order to provide an accurate representation of the document as it would appear in "printed" form. In some embodiments, the rendering may also be customized for the specific display type, size, etc. of the mobile computing device 200 on which it will be displayed. For example only, the rendering may be configured such that it fills the usable area of the display on the mobile computing device 200.

In some embodiments, the rendering of the document can be an image that can be annotated by a user. In other embodiments, the rendering can be of the same file type as the original document, that is, the rendering of the document would not require format exportation/conversion. For example only, the rendering of the document could be a vector graphics file (such as a portable document format (.PDF) file or a scalable vector graphics (.SVG) file), a Graphics Interchange Format (.GIF) file, a Tagged Image File Format (.TIFF) file, or any other suitable file type (.JPEG, .PNG, .BMP, etc.).

The user interface element may be provided when the mobile computing device is detected. In some implementations, the user interface element may only be provided when the mobile computing device is authenticated or otherwise associated with a user. For example, a user may be associated with the computing device and the mobile computing device by being logged into a same account at both the computing device and the mobile computing device, the server having stored registry information linking both the computing device and the mobile computing device to the user, or the like.

When the user selects the user interface element on the computing device (e.g., the desktop computer 104), the computing device may transmit a user request, e.g., to the server 208, to issue a command, e.g., to the mobile computing device 200, to cause the mobile computing device to display a rendering of the document. The mobile computing device 200 may be running a background process or daemon to monitor for commands from a server or other computing device and, on receiving the command, to display the rendering. The computing device may generate the rendering locally, or the computing device may transmit the document to the server and the server may generate the rendering. Alternatively, the mobile computing device 200 can generate the rendering based on document information, e.g., received from the server 208 and/or computing device 104. As previously mentioned, the document may already be of a suitable format and therefore generation of the rendering of the document may not be required.

In some embodiments, the receipt of the command may override some or all of the operating functions at the mobile computing device 200 such that the mobile computing device 200 will automatically display the rendering of the document upon receipt of the command. In this manner, the mobile computing device 200 will exit its current operating condition and automatically switch to a displayed rendering of the document. For example only, in the event that the mobile computing device 200 is in a sleep or other similar power-saving mode, upon receipt of the command the mobile computing device 200 may be "awakened." The user 120 may be able to configure which programs (if any) may be overridden upon receipt of the command through the setting of user permissions. Further, the user 120 may be prompted by a selectable "pop-up" or other prompt to permit the rendering of the document to be displayed. Through the use of this automatic displaying of the rendering of the document, the user 120 may "print" a document to his or her mobile computing device, e.g., the mobile computing device 200, for viewing, reading and annotating, as further described below.

As mentioned, the mobile computing device may provide the rendering of the document to the user for annotating. For example, the rendering of the document may automatically be opened as a "print view" upon receipt at the mobile computing device. This may be referred to as an "annotating mode." The user may annotate the rendering of the document by drawing using one or more fingers, a stylus, or the like, via a touch display of the mobile computing device. For example, annotating software or an annotating application used by the mobile computing device may have various annotating modes such as a pen or a highlighter. The annotations to the rendering of the document may be overlaid onto the rendering of the document. For example, the annotations may be separated into one or more layers overlaying the rendering of the document. As described above, the mobile computing device may also prevent the modification of the rendering, e.g., by allowing annotation of the rendering but not changes to the text or underlying rendering/document.

The user may select one or more of a plurality of operations to be performed using the annotated rendering of the document. The plurality of operations may include, but is not limited to, sending the annotated rendering of the document directly to a paper printer, saving the annotated rendering of the document to local memory or at the server (in the cloud), and discarding the annotated rendering of the document. The user may select the one or more operations at the mobile computing device. When the user is done annotating the rendering of the document, the mobile computing device could transmit the annotated rendering of the document back to the server, e.g., after the user selects to save the annotated rendering of the document at the server. In some embodiments, the mobile computing device can transmit the annotation information (e.g., the one or more layers of annotations) but not the rendering itself to the server 208. The server can then selectively provide the annotated rendering of the document (or the annotation information and the rendering) to a display of another computing device to display the annotated rendering of the document to the user.

The mobile computing device 200 can include a touch display 204, e.g., a capacitive sensing display, which both provides information to and receives input from the user 120. In some embodiments, the mobile computing device 200 may display a "virtual keyboard" on the touch display 204 that can be utilized to provide input to the mobile computing device 200. Accordingly, in some embodiments, the mobile computing device 200 is not associated with a physical keyboard or keypad. In some embodiments, the mobile computing device 200 may alternatively or additionally include other physical user interface components, such as a full or a partial QWERTY-based keyboard, a remote control interface (not shown) for receiving input from a remote control, or the like.

The system 100 may also include a server 208. The server 208 can communicate with the computing device 104 and/or the mobile computing device 200 via the network 124. The server 208 can include one or more processors and memory. The server 208 can remotely store documents for the user 120 (in the cloud) at the memory. In this manner, the user 120 can access the documents at the server 208, e.g., via the computing device 104 and/or the mobile computing device 200. The server 208 can also implement the coordinated annotating techniques of to the present disclosure and therefore can handle and/or store renderings of documents and/or annotated renderings of documents.

The server 208 can provide a user interface element to the computing device 104. In some implementations, the server 208 can provide the user interface element to the computing device 104 when the user 120 is associated with both the computing device 104 and the mobile computing device 200. The server 208 can determine whether the user 120 is associated with both the computing device 104 and the mobile computing device 200 by determining whether the user 120 is logged into an account, e.g., an e-mail account, at both the computing device 104 and the mobile computing device 200. Alternatively, the server 208 can determine whether the user 120 is associated with both the computing device 104 and the mobile computing device 200 by searching registry information stored at the server 208. The registry information can indicate whether the computing device 104 and/or the mobile computing device 200 are associated with (or "registered" to) the user 120. Determination of whether the user 120 is associated with both the computing device 104 and the mobile computing device 200 can also be referred to as "authentication" or "authentication of the mobile computing device 200" (when the user 120 is already using the computing device 104).

In response to receiving the user interface element from the server 208, the computing device 104 may display the user interface element to the user 120 via the display 112 of the computing device 104, such as in a graphical user interface (GUI). In some implementations, the computing device 104 may only provide the user interface element when the mobile computing device 200 is authenticated. Selection of the user interface element by the user 120 can indicate a request by the user 120 to transmit a rendering of a document from the server 208 to the mobile computing device 200 for annotating. For example, the document may be a document currently opened via word processing software at the computing device 104 and the user interface element may be provided in an existing menu, e.g., a print menu or a file menu. Additionally or alternatively, for example, the user interface element could be provided in as a toolbar icon or in a pop-up window when the mobile computing device 200 is detected and authenticated. After selection of the user interface element, the server 208 may then transmit a rendering of the document to the mobile computing device 200. For example, the rendering may be any suitable type of file. The rendering of the document may be generated either locally, e.g., at the computing device 104, or remotely, e.g., at the server 208. The rendering could also be generated at the mobile computing device 200 based on document information, e.g., received from the server 208 and/or the computing device 104. Additionally, as previously described, the original format of the document may be the desired rendering format and therefore generation of the rendering may not be required.

Once the rendering of the document has been transmitted to the mobile computing device 200, the user 120 may provide annotation information that corresponds to one or more annotations to the rendering of the document via the mobile computing device 200, e.g., via the touch display 204. When the rendering of the document is received at the mobile computing device 200, the mobile computing device 200 may automatically open the rendering of the document in annotating software or an annotating application, e.g., a print view of the rendering. The user 120 may annotate the rendering of the document via one or more annotating modes, e.g., a pen annotating mode or a highlighter annotating mode, by providing touch input via the touch display 204. For example, the user 120 may draw with his/her finger or a stylus on the rendering of the document via the touch display 204. The annotations to the rendering of the document may be overlaid on the rendering of the document.

After annotation of the rendering of the document is complete, the user 120 may be provided with a plurality of different commands indicating various operations to be executed using the annotated rendering of the document. For example, the plurality of commands may include save to memory of the mobile computing device 200 or to the server 208 ("save"), send directly to the paper printer 116 ("print"), and discard the annotated rendering of the document ("discard"). It should be appreciated that other suitable commands can also be implemented as options, such as e-mail the annotated rendering of the document to another user and/or share the annotated rendering of the document with another user. The user 120 may select one or more of the plurality of commands via the mobile computing device 200. The annotated rendering of the document could then be transmitted to another device, e.g., save to the server 208 or e-mail to/share with another user. When the annotated rendering of the document is saved to the server 208, the user could then access the annotated rendering of the document via another computing device, e.g., computing device 104.

Figure 2:
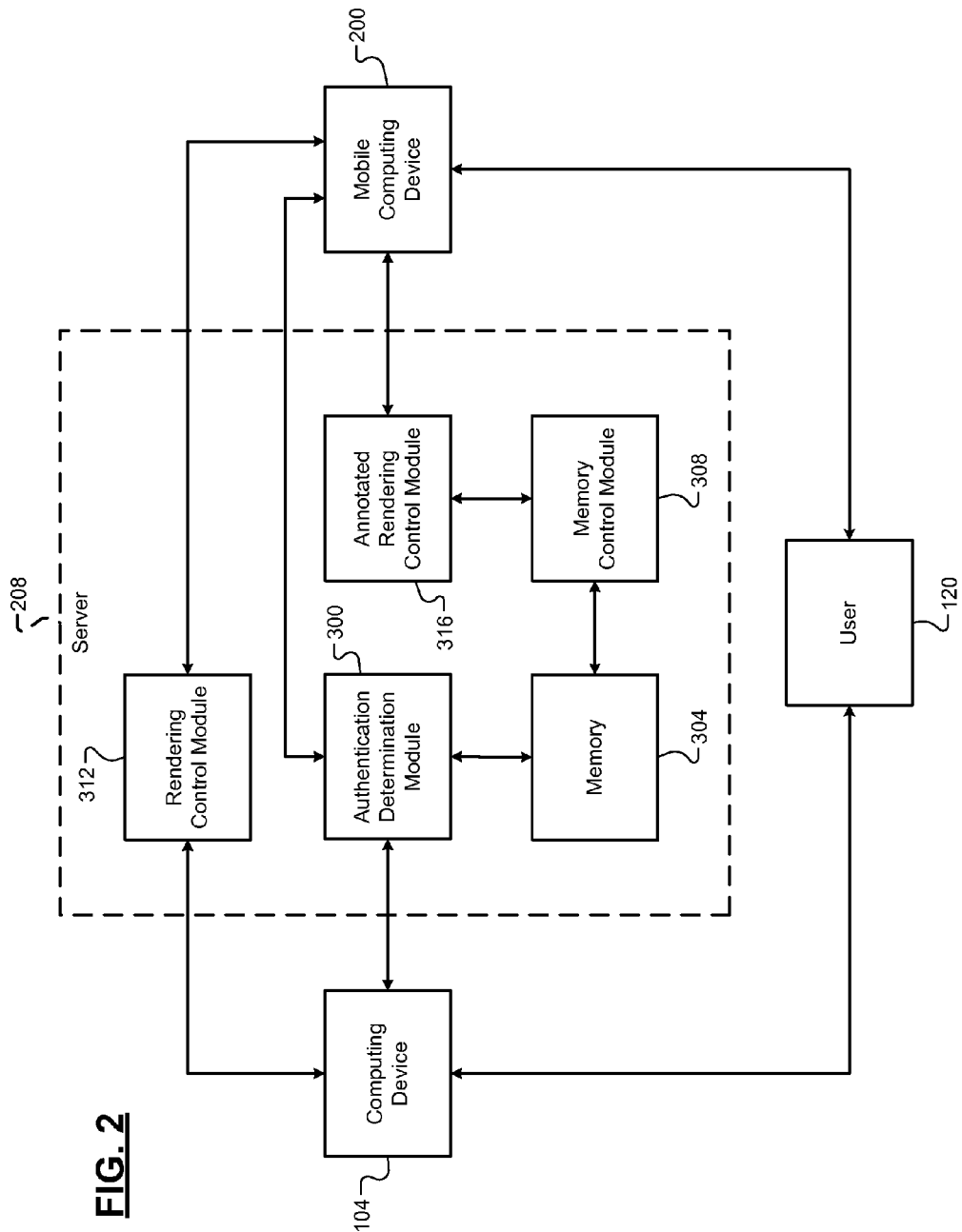
FIG. 2 is a functional block diagram of the example server of FIG. 1.

Referring now to FIG. 2, an example of the server 208 is illustrated. The server 208 can include an authentication determination module 300, a memory 304, a memory control module 308, a rendering control module 312, and an annotated rendering control module 316. While these components are shown and described herein, the computing device 104 may also include other suitable components such as one or more processors, a transceiver, and the like. Additionally, the modules introduced above and described in detail below may be part of or executed by the one or more processors. The authentication determination module 300 communicates with the computing device 104 and the mobile computing device 200 to determine whether the mobile computing device 200 is authenticated, i.e., whether the user 120 is associated with both the computing device 104 and the mobile computing device 200. For example, the authentication determination module 300 may determine that the mobile computing device 200 is authenticated when the user is logged into the account at both the mobile computing device 200 and the computing device 104, e.g., an electronic mail (e-mail) account. Alternatively, for example, the authentication determination module 300 can search registry information stores in the memory 304, e.g., via the memory control module 308, in order to determine whether the computing device 104 and the mobile computing device 200 are both associated with the user 120. Other suitable authentication techniques may also be used.

When the mobile computing device 200 is authenticated, the rendering control module 312 can provide the user interface element to the computing device 104. When the user interface element is received, the computing device 104 can provide the user 120 with a GUI showing the user interface element, such as a selectable command, indicating a request to transmit a rendering of the document from the server 208 to the mobile computing device 200. For example, the user interface element may be provided to the user 120 via the display 112 of the computing device 104, and the selection of the user interface element may be input by the user 120 via the user interface 108. In some implementations, the computing device 104 may include a separate control module for handling the GUI presented to the user 120 via the display 112 of the computing device 104. As previously described, the user interface element can be provided in a print or file menu, as an icon in a toolbar, via a pop-up window, or the like.

The rendering control module 312 receives the rendering of the document from the computing device 104. As previously described, the computing device 104 can generate the rendering of the document. A plurality of different types of files may be suitable for the rendering of the document, as described above. While the generation of the rendering is described to occur at the computing device 104, it should be appreciated that the rendering of the document could also be generated either at the server 208 (at the rendering control module 312) or at the mobile computing device 200.

Depending on the input provided by the user 120 at the mobile computing device 200 after annotating is complete, the server 208 can receive the annotated rendering of the document. Specifically, the mobile computing device 200 can transmit the annotated rendering of the document to the server 208 when the user 120 selects to "save" the annotated rendering of the document to the server 208, e.g., to memory 304. Additionally or alternatively, the mobile computing device 200 can periodically save the annotated rendering of the document to the server 208 or local memory. The annotated rendering of the document could then be accessible by the user 120 via other computing devices, e.g., computing device 104. For example, the user 120 could access the annotated rendering of the document at the computing device 104 and could make edits to the original document based on the annotated rendering of the document. The user 120 could then send the edited document to the paper printer 116.

In some embodiments, the rendering of the document displayed at the mobile computing device 200 can be stored in the cloud (e.g., at the server 208) and merely displayed at the mobile computing device 200, e.g., via a scripting language or other communication interface. In these embodiments, the annotation information can also be stored as the user 120 is annotating the rendering or shortly thereafter.

Figure 3:
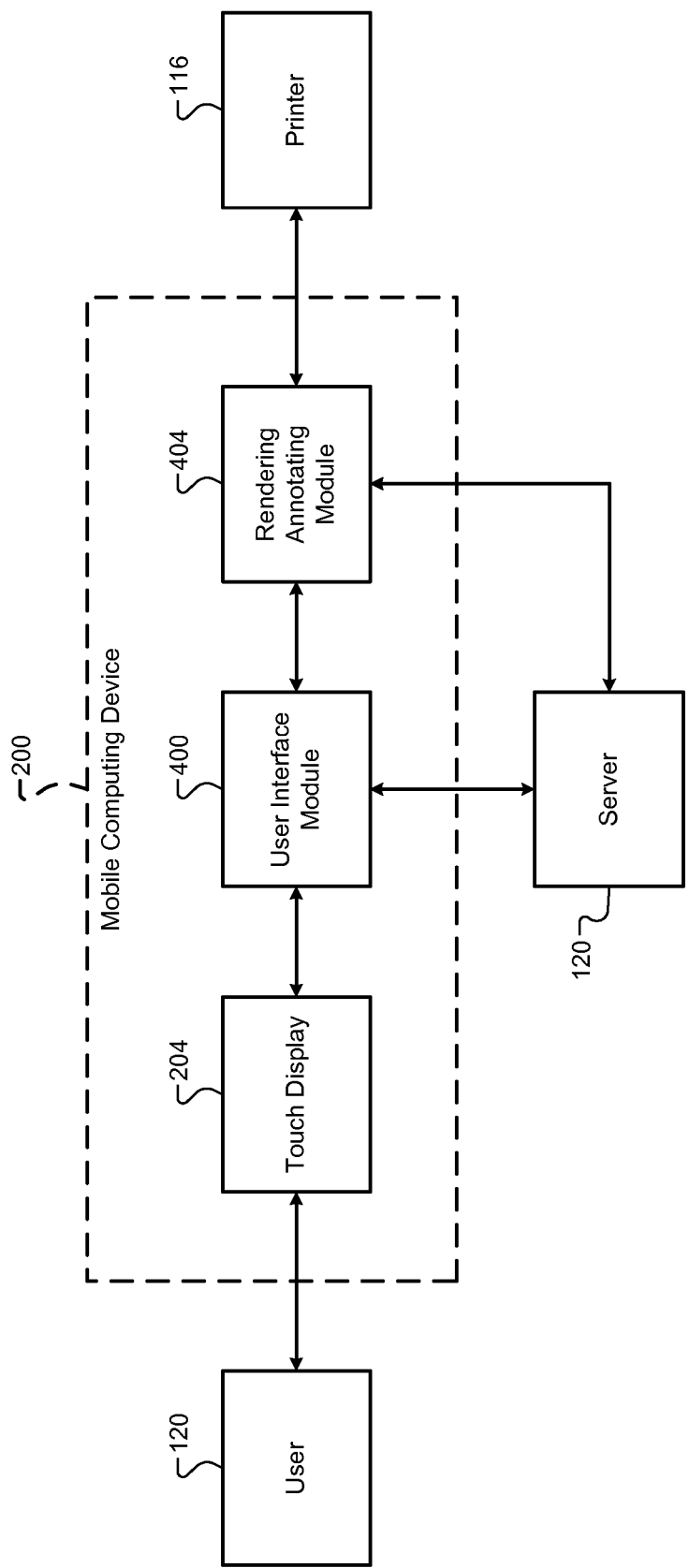
FIG. 3 is a functional block diagram of the example mobile computing device of FIG. 1.

Referring now to FIG. 3, an example of the mobile computing device 200 is illustrated. The mobile computing device 200 can include the touch display 204, a user interface module 400, and a rendering annotating module 404. While these components are shown and described herein, the mobile computing device 200 may also include other suitable components such as one or more processors, memory, a transceiver, and the like. Additionally, the modules introduced above and described in detail below may be part of or executed by the one or more processors.

The touch display 204 both provides information to and receives input from the user 120. As previously mentioned, for example, the touch display 204 may be a capacitive sensing display. The user interface module 400 controls operation of the touch display 204 and thereby controls communication with the user 120. The user interface module 400, therefore, coordinates annotating of the rendering of the document between the mobile computing device 200 and the user 120. In other words, the user interface module 400 can act as an intermediary between the rendering annotating module 404 and the user 120 (via the touch display 204). The user interface module 400 may translate the input from the user 120 for use by the rendering annotating module 404 in generating an annotated rendering of the document. In some embodiments, the user interface module 400 can determine whether the mobile computing device 200 or its touch display 204 is in an inactive state (such as being OFF or in a sleep mode). Further, the user interface module 400 operate in conjunction with the server 208 to authenticate the user 120 to be associated with the mobile computing device 200.

The user interface module 400 can also receive the command from the rendering control module 312 of the server 208. In response to the command, the user interface module 400 can command the touch display 204 to display the rendering of the document. In the situation where the user interface module 400 has determined that the mobile computing device 200 or its touch display 204 is in an inactive state, the user interface module 400 can activate the touch display and "awaken" the mobile computing device 200 upon automatically displaying the rendering. This can be referred to as the "annotating mode." In general, the user 120 may provide spot input (input at a single spot on the touch display 204) or slide input (sliding input across the touch display 204). For example, the user 120 may provide spot input when selecting a command such as a command to end annotating of the rendering of the document. Alternatively, for example, the user 120 may provide spot input when selecting the annotating mode, such as a pen mode or a highlighting mode. Additionally, for example, the user 120 may provide slide input when annotating the document, such as sliding his/her finger or a stylus to strikethrough or underline a word. Both input techniques, however, may be used for selecting commands and/or annotating the rendering of the document.

The rendering annotating module 404 annotates the rendering of the document. More specifically, the rendering annotating module 404 generates an annotated rendering of the document based on the rendering of the document and the annotations received from the user 120 via the touch display 204. It should be appreciated that the use of the touch display 204 is but one example of how the user 120 may annotate the rendering and other input techniques and devices may be utilized to annotate the document. The rendering annotating module 404 may generate the annotated rendering of the document by overlaying the annotations provided by the user 120 on top of the rendering of the document. In some embodiments, the rendering annotating module 404 may prevent modification of the rendering, as described above. Therefore, the annotated rendering of the document may have two (or more) layers. For example, annotations made in the different annotating modes may be separated into different layers. Additionally or alternatively, for example, annotations made at different times may be separated into different layers. While overlaying the annotations over the rendering of the document to obtain the annotated rendering of the document are described herein, other suitable annotating techniques may be used, e.g., incorporating the annotations into the rendering of the document.

After annotating of the rendering of the document is complete, e.g., after the annotated rendering of the document has been generated, the user 120 can select one or more of a plurality of operations to be performed using the annotated rendering of the document. The user 120 can select the one or more of the plurality of operations by providing an input to the mobile computing device 200 via the touch display 204. The plurality of operations can include saving the annotated rendering of the document locally (to memory of the mobile computing device 200) or transmitting the annotated rendering of the document to the server 208 for storage in the memory 304. The plurality of operations can also include transmitting the annotated rendering of the document directly to the paper printer 116 (via the network 124) for printing. The plurality of operations can also include discarding the annotated rendering of the document, e.g., deleting the annotated rendering of the document from random access memory (RAM) at the mobile computing device 200. Other suitable operations can also be performed, such as e-mailing or sharing the annotated rendering of the document with one or more other users.

Figure 4:
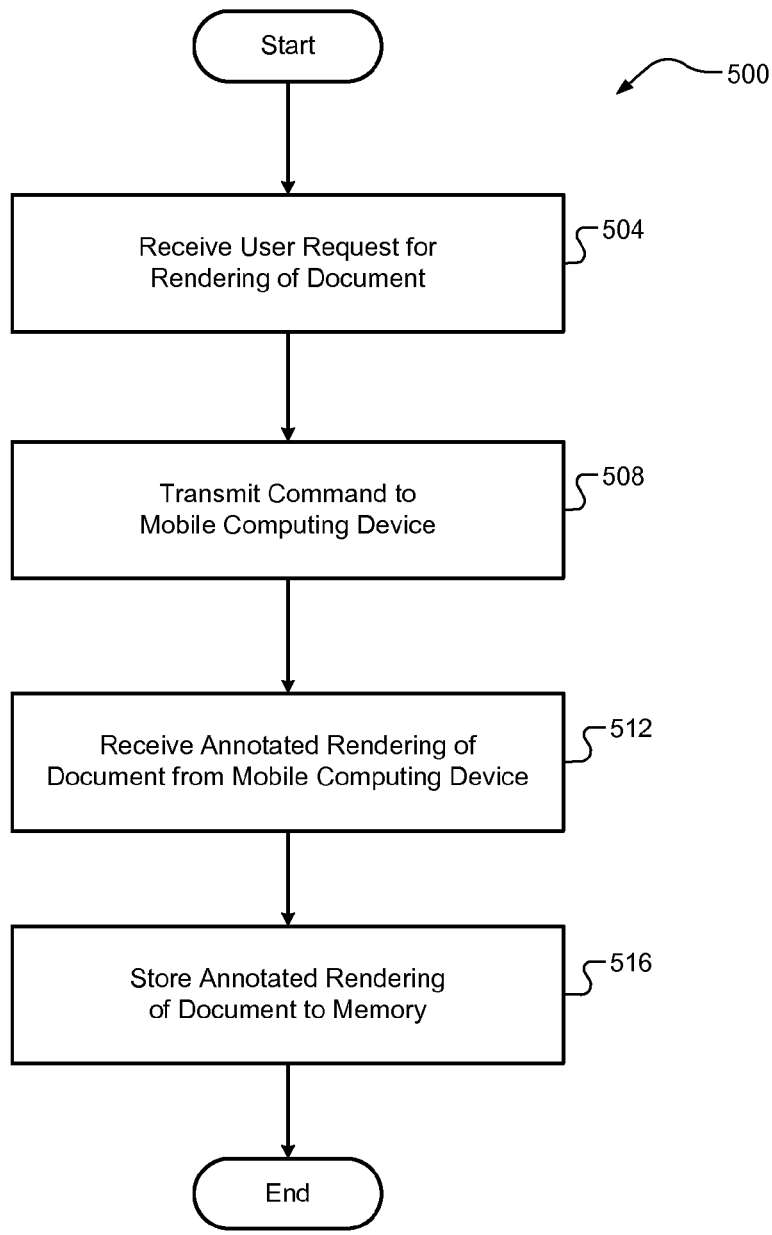
FIG. 4 is a flow diagram illustrating an example technique for coordinating annotating of a document by a user between a computing device and a mobile computing device according to some implementations of the present disclosure.

Referring now to FIG. 4, an example of a technique 500 for coordinating annotating of a document by the user 120 between the computing device 104 and the mobile computing device 200 is illustrated. At 504, the rendering control module 312 receives a user request for a rendering of the document from the computing device 104. The rendering control module 312 can receive the user request after first authenticating the mobile computing device 200. Additionally, the user request may be received after selection of the user interface element by the user 120 at the computing device 104. At 508, the rendering control module 312 transmits a command to the mobile computing device 200. The command causes the mobile computing device 200 to automatically display a rendering of the document. As described more fully above, the rendering of the document can be generated at the server 208, the computing device 104 and/or the mobile computing device 200. At 512, the annotated rendering control module 316 receives an annotated rendering of the document from the mobile computing device 200. The annotated rendering can include the rendering of the document and annotations made by the user 120 to the rendering of the document via the mobile computing device 200. At 516, the memory control module 308 stores the annotated rendering of the document in the memory 304. Control may then end or return to 504 for one or more additional cycles.

Figure 5:
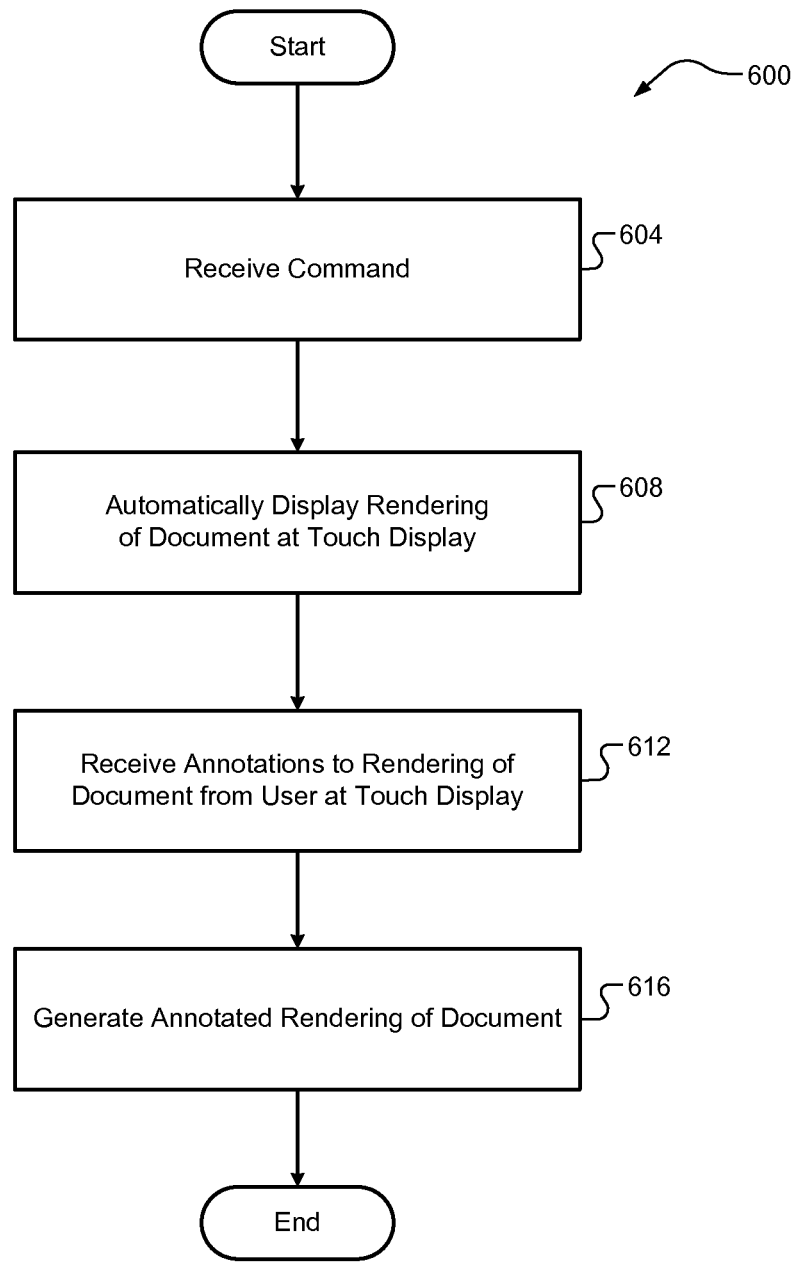
FIG. 5 is a flow diagram illustrating another example technique for coordinating annotating of a document by a user between a computing device and a mobile computing device according to some implementations of the present disclosure.

Referring now to FIG. 5, an example of a technique 600 for coordinating annotating of a document by the user 120 between the computing device 104 and the mobile computing device 200 is illustrated. At 604, the user interface module 400 receives a command from the server 208. At 608, the touch display 204 automatically displays the rendering of the document in response to the command. As described more fully above, the rendering of the document can be generated at the server 208, the computing device 104 and/or the mobile computing device 200. For example, the user interface module 400 may command the touch display 204 to automatically display the rendering of the document. At 612, the touch display 204 receives annotations to the rendering of the document from the user 120. At 616, the rendering annotating module 404 generates an annotated rendering of the document by overlaying the annotations onto the rendering of the document. Control may then end or return to 604 for one or more additional cycles.

Figure 6:
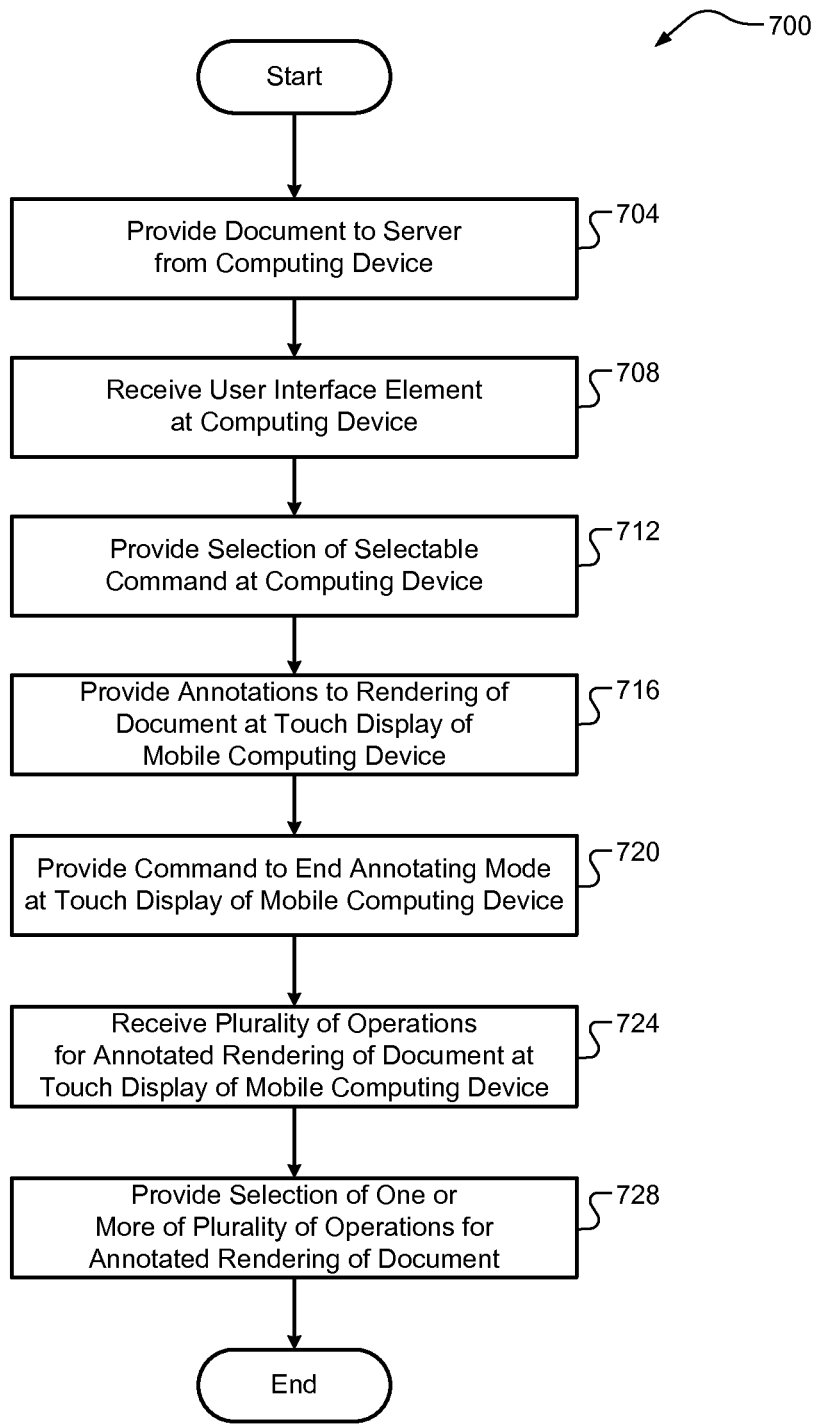
FIG. 6 is a flow diagram illustrating an example technique for interaction by a user with a computing device and a mobile computing device during coordinated annotating of a document according to some implementations of the present disclosure.

Referring now to FIG. 6, an example of a technique 700 for interaction by the user 120 with the computing device 104 and the mobile computing device 200 for coordinated annotating of a document is illustrated. At 704, the user 120 provides a document to the server 208 from the computing device 104. The server 208 can authenticate the mobile computing device 200, e.g., determine whether the mobile computing device 200 is present and whether the user 120 is associated with the mobile computing device 200. At 708, the user 120 receives a user interface element at the computing device 104 when the mobile computing device 200 is authenticated. At 712, the user 120 provides a selection of the user interface element at the computing device 104. As described above, the computing device 104 can generate and provide a rendering of the document to the server 208, the server 208 can generates the rendering of the document, or the mobile computing device can generate the rendering of the document. The server 208 provides a command to the mobile computing device 200 and, in response to the command, the mobile computing device 200 displays the rendering of the document at the touch display 104. At 716, the user 120 provides annotations to the rendering of the document via the touch display 104. At 720, the user 120 provides a command that annotating of the rendering of the document is complete. The mobile computing device 200 then generates the annotated rendering of the document by overlaying the annotations over the rendering of the document in one or more different layers. At 724, the user 120 receives one or more of a plurality of operations for the annotated rendering of the document via the touch display 204 of the mobile computing device 200. At 728, the user 120 provides input as to at least one of the one or more operations to perform using the annotated rendering of the document. Control may then end or return to 704 for one or more additional cycles.

In some embodiments, the user 120 can set a scheduled display time in the future at the mobile computing device 200, the server 208 and/or the computing device 104. In this manner, at the scheduled display time the mobile computing device 200 will automatically display a rendering of a document according to a user's desires. Further, the scheduled display time could be coordinated with a calendar application, e.g., to simply and easily provide a rendering of a document at desired time (for a business or other meeting, a class, etc.). For example only, these techniques will permit the user 120 to schedule a number of meetings close together in time and ensure that the appropriate document(s) are available at the appropriate time, without intervention of the user 120 at the time. Similarly, the user 120 can set a scheduled location for displaying the rendering using the mobile computing device 200, the server 208 and/or the computing device 104. The scheduled location can be any a desired place (e.g., in a meeting room, a colleague's office, or auditorium) and can be determined by the mobile device by using a location service on the mobile computing device 200. In the above embodiments, the automatic display of the rendering of the document on the mobile computing device 200 includes delaying the displaying of the rendering until a particular time or until the mobile computing device 200 is at a particular location, respectively. The determination of whether the mobile computing device 200 is at a particular location may be performed by the use of geolocation, geofences or any other location determination device and/or technique.

While the embodiments above primarily related to the use of the server 208 to provide interaction between the computing device 104 and the mobile computing device 200, it should be appreciated that the computing device 104 and the mobile computing device 200 may alternatively or additionally communicate without inclusion of the server 208, either directly with each other or through other intermediate devices different from the server 208. For example only, the computing device 104 and the mobile computing device 200 may communicate using any known communication technique, such as by using a BLUETOOTH®, Near Field Communication, infra-red or other communication link. In some embodiments, these communication techniques can be utilized to send the rendering of the document directly, or to send a command to obtain the rendering through other channels, e.g., from the server 208.

Furthermore, while the description above has been limited to displaying a rendering of a document at a single mobile computing device 200, it should be appreciated that the described techniques can be utilized with a plurality of mobile computing devices. For example only, a rendering of a document can be provided for automatic display on a plurality of mobile computing devices 200 associated with attendees at a meeting, students in a classroom, people at an organized demonstration, and the like. In this manner, the techniques can provide for a form of electronic material distribution, such as flyers, advertisements, presentations, classroom tests, and the like. Further, in some embodiments annotations (such as annotation information or layers of annotations) from some or all of the plurality of mobile computing devices 200 can be collected after an appropriate time period (e.g., at the end of a class or meeting). This may be utilized, for example, by a meeting organizer to receive feedback from the attendees of the meeting, or by a teacher conducting a multiple choice or other test. The annotation information can be recovered anonymously or the annotation information can be associated with its corresponding user (in order to permit testing).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain aspects of the described techniques include process steps and instructions described herein in the form of an algorithm. It should be noted that the described process steps and instructions could be embodied in software, firmware or hardware, and when embodied in software, could operate from different platforms and/or devices.

The present disclosure also relates to one or more apparatuses for performing the operations herein. These apparatuses may be specially constructed for the required purposes, or it may comprise general-purpose computer(s) selectively activated or reconfigured by a computer program stored on a computer readable medium that can be accessed by the computer(s). Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Other embodiments are within the following claims.

What is claimed is:

1. A computer-implemented method comprising:
   determining, at a server including one or more processors, whether a user is logged into a same account at both a computing device and a handheld mobile computing device having a touch display;
   in response to determining that the user is logged into the same account at both the computing device and the handheld mobile computing device, providing, from the server, a user interface element to the computing device, wherein receiving the user interface element causes the computing device to display the user interface element in a print menu of document editing software that is executing on the computing device and currently editing a document;
   receiving, at the server, a user request for a rendering of the document at the handheld mobile computing device, the user request being issued by the computing device upon selection of the user interface element by the user at the computing device;

transmitting, from the server, a command to the handheld mobile computing device that causes the handheld mobile computing device to automatically display the rendering of the document;

receiving, at the server, annotation information from the handheld mobile computing device, the annotation information corresponding to one or more handwritten annotations to the rendering made by the user via the touch display of the handheld mobile computing device; and storing, at a memory of the server, the annotation information.

2. The computer-implemented method of claim 1, wherein the annotation information includes one or more layers including the one or more handwritten annotations, the one or more layers overlaying the rendering of the document.

3. The computer-implemented method of claim 1, wherein the rendering comprises an image of the document.

4. A computer-implemented method comprising:

receiving, at a handheld mobile computing device including one or more processors, a command from a server, the command being associated with a user request received at another computing device for a rendering of a document being edited in document editing software executing at the other computing device, wherein the server provides a user interface element to the other computing device in response to determining that a user is logged into a same account at both the handheld mobile computing device and the other computing device, wherein receipt of the user interface element causes the other computing device to display the user interface element in a print menu of the document editing software, and wherein the user request is indicative of a selection of the user interface element at the other computing device;

obtaining, at the handheld mobile computing device, the rendering of the document;

automatically displaying, at a touch display of the handheld mobile computing device, the rendering of the document in response to the command;

receiving, via the touch display of the handheld mobile computing device, handwritten annotations to the rendering of the document from the user; and generating, at the handheld mobile computing device, an annotated version of the rendering by overlaying the handwritten annotations over the rendering of the document.

5. The computer-implemented method of claim 4, wherein the annotated version of the rendering includes a plurality of layers, the plurality of layers including the rendering of the document and one or more layers of the handwritten annotations made by the user via the handheld mobile computing device.

6. The computer-implemented method of claim 5, wherein the one or more layers of handwritten annotations are separated based on at least one of an annotation mode used by the user to make the handwritten annotations and a time at which the user made the handwritten annotations.

7. The computer-implemented method of claim 5, further comprising transmitting, from the mobile computing device, the one or more layers of the handwritten annotations but not the rendering to the server for storage.

8. The computer-implemented method of claim 4, further comprising receiving an input from the user at the handheld mobile computing device after generation of the annotated version of the rendering, the input indicating one or more devices to receive the annotated version of the rendering.

9. The computer-implemented method of claim 8, further comprising transmitting, from the handheld mobile computing device, the annotated version of the rendering to a paper printer in response to the input.

10. The computer-implemented method of claim 8, further comprising transmitting, from the handheld mobile computing device, the annotated version of the rendering to the server for storage.

11. The computer-implemented method of claim 4, wherein obtaining the rendering of the document comprises:

receiving, at the handheld mobile computing device, document information associated with the document; and generating, at the handheld mobile computing device, the rendering of the document based on the document information received.

12. The computer-implemented method of claim 4, wherein obtaining the rendering of the document comprises receiving, at the handheld mobile computing device, the rendering of the document from at least one of the server and the other computing device.

13. The computer-implemented method of claim 4, further comprising preventing, at the handheld mobile computing device, modification of the rendering.

14. The computer-implemented method of claim 4, further comprising determining, at the handheld mobile computing device, that the touch display of the handheld mobile computing device is in an inactive state, wherein automatically displaying the rendering includes activating the touch display.

15. The computer-implemented method of claim 4, wherein automatically displaying the rendering includes filling a usable area of the touch display.

16. The computer-implemented method of claim 4, wherein automatically displaying the rendering includes delaying displaying of the rendering until the handheld mobile computing device is at a particular location or until a particular time.

17. A handheld mobile computing device comprising one or more processors, the handheld mobile computing device further comprising:

a user interface module configured to:
receive, from a server, a command associated with a user request received at another computing device for a rendering of a document being edited in document editing software executing at the other computing device, wherein the server provides a user interface element to the other computing device in response to determining that a user is logged into a same account at both the handheld mobile computing device and the other computing device, wherein receipt of the user interface element causes the other computing device to display the user interface element in a print menu of the document editing software, and wherein the user request is indicative of a selection of the user interface element at the other computing device and obtain the rendering of the document;

a touch display configured to:
automatically display the rendering of the document in response to the command, and
receive handwritten annotations to the rendering of the document from the user; and a rendering annotating module configured to generate an annotated version of the rendering by overlaying the handwritten annotations over the rendering of the document.

18. The handheld mobile computing device of claim 17, wherein the annotated version of the rendering includes a plurality of layers, the plurality of layers including the rendering of the document and one or more layers of the handwritten annotations made by the user via the handheld mobile computing device.

19. The handheld mobile computing device of claim 18, wherein the one or more layers of handwritten annotations are separated based on at least one of an annotation mode used by the user to make the handwritten annotations and a time at which the user made the handwritten annotations.

20. The handheld mobile computing device of claim 18, wherein the rendering annotating module is further configured to transmit the one or more layers of the handwritten annotations but not the rendering to the server for storage.

21. The handheld mobile computing device of claim 17, wherein the user interface module is further configured to receive an input from the user after generation of the annotated version of the rendering, the input indicating one or more devices to receive the annotated version of the rendering.

22. The handheld mobile computing device of claim 21, wherein the rendering annotating module is further configured to transmit the annotated version of the rendering to a paper printer in response to the input.

23. The handheld mobile computing device of claim 17, wherein the rendering annotating module is further configured to transmit the annotated version of the rendering to the server for storage in response to the input.

24. The handheld mobile computing device of claim 17, wherein the user interface module obtains the rendering of the document by receiving document information associated with the document, and generates the rendering of the document based on the document information received.

25. The handheld mobile computing device of claim 17, wherein the user interface module obtains the rendering of the document by receiving the rendering of the document from at least one of the server and the other computing device.

26. The handheld mobile computing device of claim 17, wherein the rendering annotating module is further configured to prevent modification of the rendering.

27. The handheld mobile computing device of claim 17, wherein the user interface module is further configured to determine that the touch display is in an inactive state and activate the touch display upon automatically displaying the rendering.

28. The handheld mobile computing device of claim 17, wherein automatically displaying the rendering includes filling a usable area of the touch display.

29. The handheld mobile computing device of claim 17, wherein automatically displaying the rendering includes delaying displaying of the rendering until the handheld mobile computing device is at a particular location or until a particular time.

30. A computer-implemented method, comprising:
  detecting, at a server including one or more processors, whether document editor software is currently executing at a computing device that is logged into an account associated with a user;
  detecting, at the server, whether a handheld mobile computing device is logged into the account associated with the user;
  in response to detecting that (i) the document editor software is currently executing at the computing device and (ii) both the computing device and the handheld mobile computing device are logged into the account:
    transmitting, from the server to the computing device, a first command that causes the document editing software to include a selectable command in one of its menus, the selectable command being configured to cause the handheld mobile computing device to obtain an image of a document currently being edited in the document editor software;
  receiving, at the server, an indication that the user selected the selectable command at the computing device;
  in response to receiving the indication, transmitting, from the server, a second command to the handheld mobile computing device, the second command causing the handheld mobile computing device to:
    (i) obtain the image of the document from at least one of the server and the computing device, and
    (ii) in response to obtaining the image of the document, automatically displaying the image of the document at a touch display of the handheld mobile computing device;
  receive, at the server, annotation information indicative of handwritten annotations made by the user to the image of the document via the touch display of the handwritten mobile computing device, the handwritten annotations having been made by the user in a locked editing mode of the handheld mobile computing device in which the rendering of the document was not modifiable and the handwritten annotations were overlaid to the rendering of the document in one or more layers; and
  at least one of:
    storing, at the server, the annotation information;
    transmitting, from the server to the computing device, the annotation information for at least one of (i) display at the computing device and (ii) storage at the computing device; and
    transmitting, from the server to a paper printer (i) directly or (ii) via the computing device, the annotation information and the image of the document, wherein receiving the annotation information and the image of the document causes the paper printer to print the annotation information and the image of the document on paper.

31. The computer-implemented method of claim 30, wherein automatically displaying the image of the document at the touch display of the handheld mobile computing device includes filling an entire usable area of the touch display.

32. The computer-implemented method of claim 31, wherein the locked editing mode prevents the user from utilizing other functions of the handheld computing device until the handwritten annotations are complete.

33. The computer-implemented method of claim 32, wherein the image of the document and the annotation information are received at the paper printer from the handheld mobile computing device (i) directly or (ii) via the computing device.

34. The computer-implemented method of claim 30, further comprising detecting, at the server, whether the handheld mobile computing device is proximate to the computing device.

35. The computer-implemented method of claim 34, wherein in response to detecting that the handheld mobile computing device is proximate to the computing device, the second command causes the handheld mobile computing device to obtain the image of the document directly from the computing device via short-range wireless communication.

36. The computer-implemented method of claim 34, wherein in response to detecting that the handheld mobile computing device is not proximate to the computing device, the second command causes the handheld mobile computing device to obtain the image of the document at least partially from the server.

37. The computer-implemented method of claim 30, wherein the handheld mobile computing device is a tablet computer or a mobile phone.

38. The computer-implemented method of claim 30, wherein the handwritten annotations are made by the user via the touch display of the handheld mobile computing device using at least one of a finger and a stylus.

* * * * *